April 18, 1950 W. J. VOECKS 2,504,763
PIGEON HOLDER FOR TRAINING BIRD DOGS
Filed Dec. 26, 1946 2 Sheets-Sheet 1
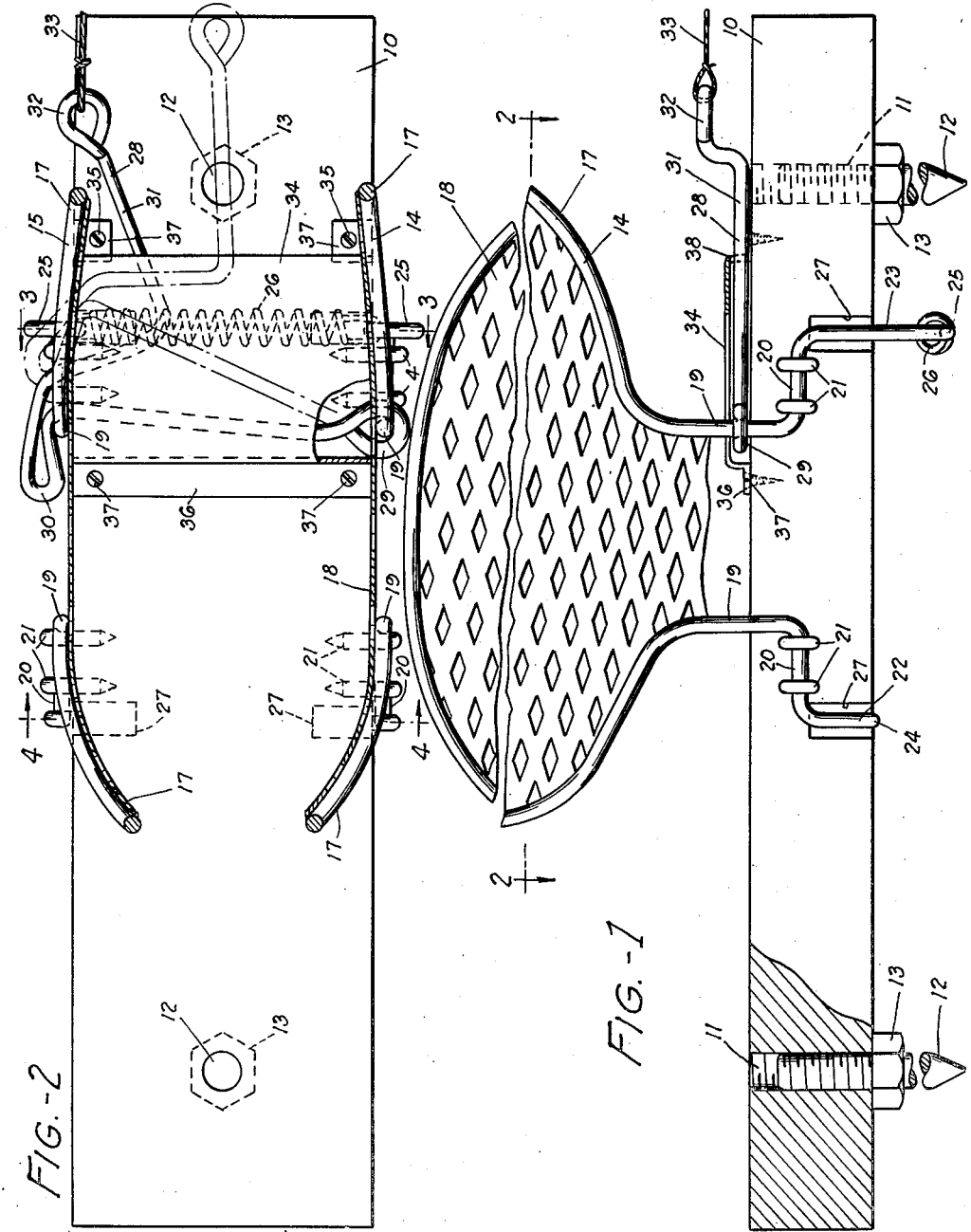
INVENTOR.
WILLIAM J. VOECKS
BY Victor J. Evans & Co.
ATTORNEYS April 18, 1950 W. J. VOECKS 2,504,763
PIGEON HOLDER FOR TRAINING BIRD DOGS
Filed Dec. 26, 1946 2 Sheets-Sheet 2
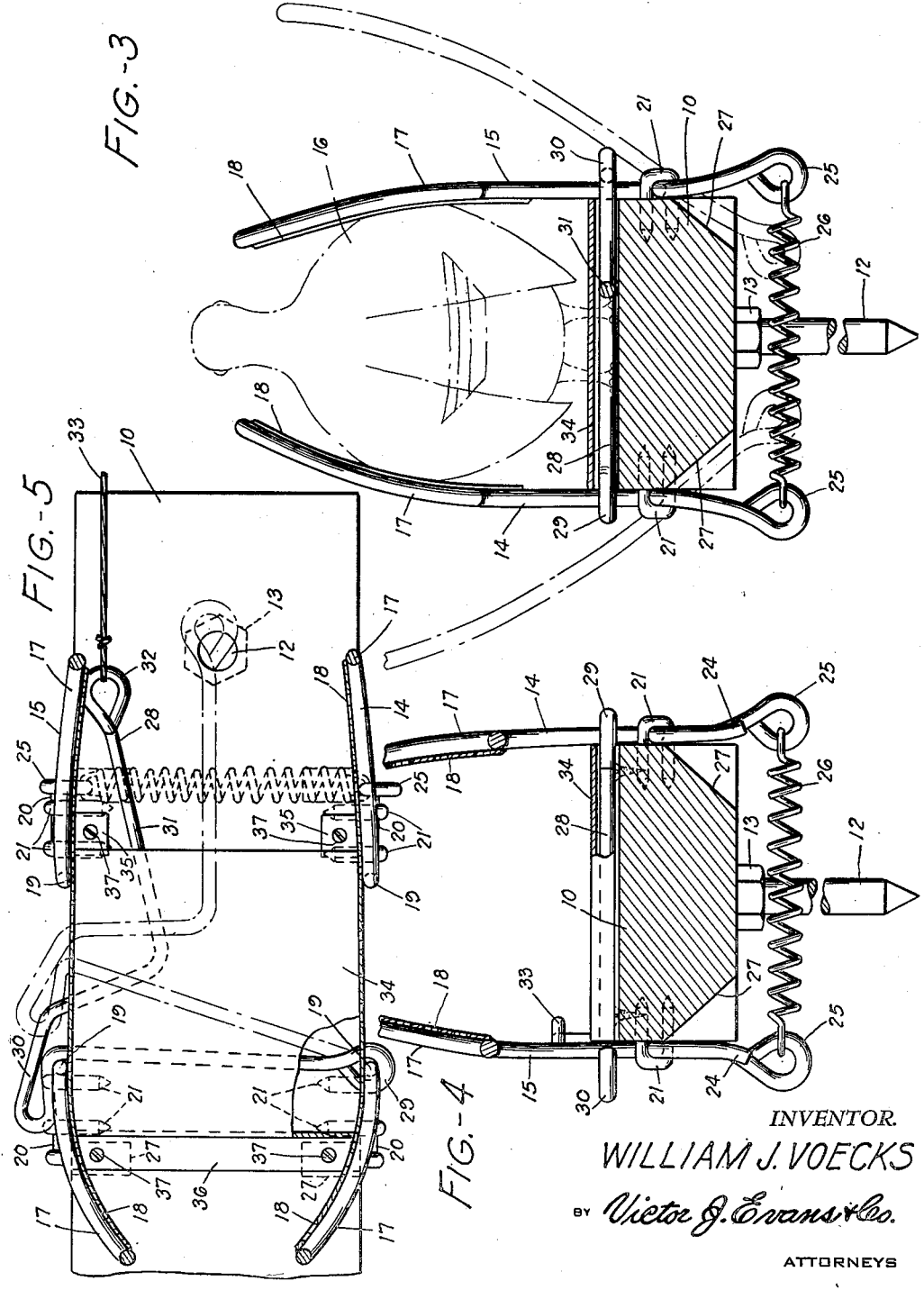
INVENTOR.
WILLIAM J. VOECKS
BY Victor J. Evans & Co.
ATTORNEYS Patented Apr. 18, 1950

2,504,763

UNITED STATES PATENT OFFICE 2,504,763

PIGEON HOLDER FOR TRAINING BIRD DOGS

William J. Voecks, Rockford, Ill.

Application December 26, 1946, Serial No. 718,383

1 Claim. (Cl. 119—15.6)

This invention relates to a pigeon holder for training bird dogs, and is especially designed to hold live pigeons or larger birds as desired.

An object of the invention is to provide a device whereby live birds may be used in training bird dogs.

Another object of the invention is to provide a device that is simple in construction and operation, is durable and efficient in use, and is inexpensive to manufacture, for the purpose designed.

With the above and other objects and advantages in view, the invention consists of the novel details of construction, arrangement and combination of parts more fully hereinafter described, claimed and illustrated in the accompanying drawings in which:

Figure 1 is a side elevational view, partly in section and partly broken away, of an embodiment of the invention;

Figure 2 is a sectional view on the line 2—2 of Figure 1, showing the trigger on the front of the wing;

Figure 3 is a sectional view on the line 3—3 of Figure 2;

Figure 4 is a sectional view on the line 4—4 of Figure 2 and

Figure 5 is a modification of the invention as shown in Figure 2, showing the trigger on the rear of the wing.

Referring more in detail to the drawings, the reference numeral 10 designates the base of the device, which may be made of wood, plastic or similar material. Adjacent each end of the base 10 are provided threaded bores 11 which are adapted to threadably receive the elongated pointed screws 12 which, pushed into the ground, will hold the device steady when in use, and lock nuts 13 will prevent the screws from becoming loosened from the base.

Wings 14 and 15 respectively are swingably mounted on each side of the base 10, and the wings are curved longitudinally and transversely to conform somewhat to the body of a pigeon 16, which is adapted to be retained between the wings.

The wings comprise a wire frame 17 having an apertured plate 18 secured thereto above the base 10 in any well known and conventional manner.

The frames are somewhat elliptical in shape longitudinally, and the free ends 19 are in vertical relation to the base 10. Horizontal portions 20 extending outwardly from each end 19 are swingably mounted on the base by staples 21, and vertical portions 22 and 23 each depend from a horizontal portion 20. The vertical portion 22 is foreshortened at 24, but the portion 23 has an eye 25 formed on its lower end. A tension spring 26 connected to the eye 25 on each wing tends to force the wings outwardly and inclined cutouts 27 in the base permit the portions 22 and 23 to swing inwardly so that the wings can completely free the pigeon 16 when released.

In Figure 1, there is shown a trigger 28 connected to the free end 19 at the front of the wing 14, while in Figure 5, the trigger 28 is connected to the free end 19 at the rear of the wing 14. Except for the point of connection of the trigger, the operation is similar in both instances.

The trigger is provided with an eye 29 which encircles either the free end 19 at the front of the wing 14 or the free end 19 at the rear of the wing 14 and the trigger 28 is bent to form a catch 30, which engages the free end 19 opposite to the free end 19 on which the eye 29 is mounted. Extending rearwardly of the catch 30 is a releasing portion 31 having an upwardly bent eye 32 thereon to which is connected the trigger releasing cord 33. A plate 34 having ears 35 and end flange 36 is mounted over the trigger 28 and fasteners 37 entering the ears 35 and flange 36 secure the plate to the base. Between the ears 35 the plate is provided with a slot 38 to permit movement of the trigger when acted upon by the cord 33.

In use, the pigeon, or any other bird that might be used for training bird dogs, is placed between the wings, as shown in Figure 3. The catch 30 on the trigger 28 will engage the wing opposite to the wing on which the trigger 28 is mounted by means of the eye 29 to confine the bird between the wings as in Fig. 3. With the cord 33 lead to a remote location, the device is ready for operation. At a suitable time, in accordance with the training of the dogs, the cord 33 is pulled, releasing the catch 30, and the action of the spring 26 will force the wings outwardly, releasing the bird.

With the release thereof, the bird will take to wing, leaving the holder, and the dog can be trained to find the bird and trained to flush the bird from its hiding place as desired.

It is believed that from the foregoing description, the operation and construction of the device will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described, comprising a base, swingable wings mounted on said base for engaging the body of a live bird and retaining the bird therein, said wings comprising a wire elliptical shaped frame, a perforated plate on said frame and said plate and said frame being curved longitudinally and transversely to conform somewhat to the body of a bird, a tension spring connected to the wings below the base for forcing said wings outwardly from said bird, a wire trigger pivoted to one wing and engaging the other wing for retaining said wings in contact with the bird, and releasing cord attached to said trigger and adapted to control said trigger for the releasing of the wings from a remote distance.

WILLIAM J. VOECKS.

REFERENCES CITED

The following references are of record in the file of this patent:

UNITED STATES PATENTS

| Number | Name | Date |
|---|---|---|
| 139,836 | Tyler | June 10, 1873 |
| 149,496 | Marsh | Apr. 7, 1874 |
| 241,377 | King | May 10, 1881 |
| 357,650 | Zeller | Feb. 15, 1887 |
| 546,491 | Maierhofer | Sept. 17, 1895 |
| 636,870 | Vankirk | Nov. 14, 1899 |
| 693,901 | Portman | Feb. 25, 1902 |
| 892,528 | Kricke | July 7, 1908 |
| 1,274,266 | Hayes | July 30, 1918 |
| 1,299,896 | Anderson | Apr. 8, 1919 |
| 1,323,071 | Krieger | Nov. 25, 1919 |
| 1,507,439 | Smith | Sept. 2, 1924 |
| 2,051,989 | Ellis | Aug. 25, 1936 |
| 2,165,937 | Nancarroll | July 11, 1939 |